United States Patent Office 3,690,827
Patented Sept. 12, 1972

3,690,827
ION EXCHANGE PROCESS FOR ALUMINUM VALUES
Donald E. Garrett, 505 W. 9th St., Claremont, Calif. 91711
Filed June 4, 1970, Ser. No. 43,379
Int. Cl. C01f 7/02; C01b 25/18; C01g 49/02
U.S. Cl. 423—112
3 Claims

ABSTRACT OF THE DISCLOSURE

Aluminum phosphate ore is solubilized by a cation exchange resin to produce a resin slurry and phosphoric acid filtrate. The resin is treated with HCl to regenerate the resin and produce an aluminum chloride solution which is then evaporated and hydrolized to aluminum oxide with the evolved HCl being recycled to the resin regeneration step. When iron is present, the iron is separated from the chloride solution by the addition of alumina to adjust the pH of the solution to a value of from about 2 to 2.5. This causes the iron to precipitate as ferric hydroxide.

---

This invention relates to an ion exchange process for recovering high purity aluminum oxide from aluminum phosphate ore. More particularly this invention relates to the recovery of aluminum values from aluminum phosphate ore using a cation exchange resin to solubilize the ore, and wherein the only reagent, hydrochloric acid, is recovered and recycled.

Previously, considerable difficulty had been experienced in recovering aluminum values from aluminum phosphate ore. In general, the previously proposed procedures encountered considerable difficulty in treating raw aluminum ore efficiently. Generally, excessive quantities of reagents were consumed, and complicated operating procedures were believed necessary. In general, previously proposed procedures could not adequately deal with impurities in the ore so as to efficiently provide a product having the desired degree of purity.

These and other difficulties of previously proposed procedures have been overcome by the present invention. In general, the present invention provides a procedure by which aluminum phosphate ore, water, and a cation exchange resin in the hydrogen form are admixed and retained in agitated contact with one another for a period of time and at an elevated temperature to convert the resin from the hydrogen form to the aluminum form. The resultant admixture is a slurry of insoluble ore, the aluminum form of the resin, and an aqueous phosphoric acid solution. The phosphoric acid solution is separated from the solids by filtration, and the insoluble ore is separated from the aluminum form of the cation exchange resin by screening. The resin is then treated with dilute hydrochloric acid to produce the hydrogen form of the resin and an aluminum chloride solution. The hydrogen form of the resin is separated from the aluminum chloride solution and is recycled to the ore contacting step. The aluminum chloride solution is evaporated to dryness and hydrolized to aluminum oxide with the resultant HCl being recycled to the resin regeneration step. The resultant aluminum oxide may be utilized in the production of aluminum, or it may be ignited to red heat to produce a powder which has a very high degree of purity.

When iron is present in the aluminum phosphate ore, it tends to be carried through the process with the aluminum so as to end up as iron oxide mixed with the aluminum in the final product. The iron may be removed by treating the aluminum chloride solution with aluminum oxide from the hydrolysis step. The pH of the chloride solution is adjusted to a value of from about 2 to 2.5 and the iron precipitates as ferric hydroxide. The ferric hydroxide precipitate is separated from the aluminum chloride solution by centrifuging, filtration, or the like.

Figure 1:
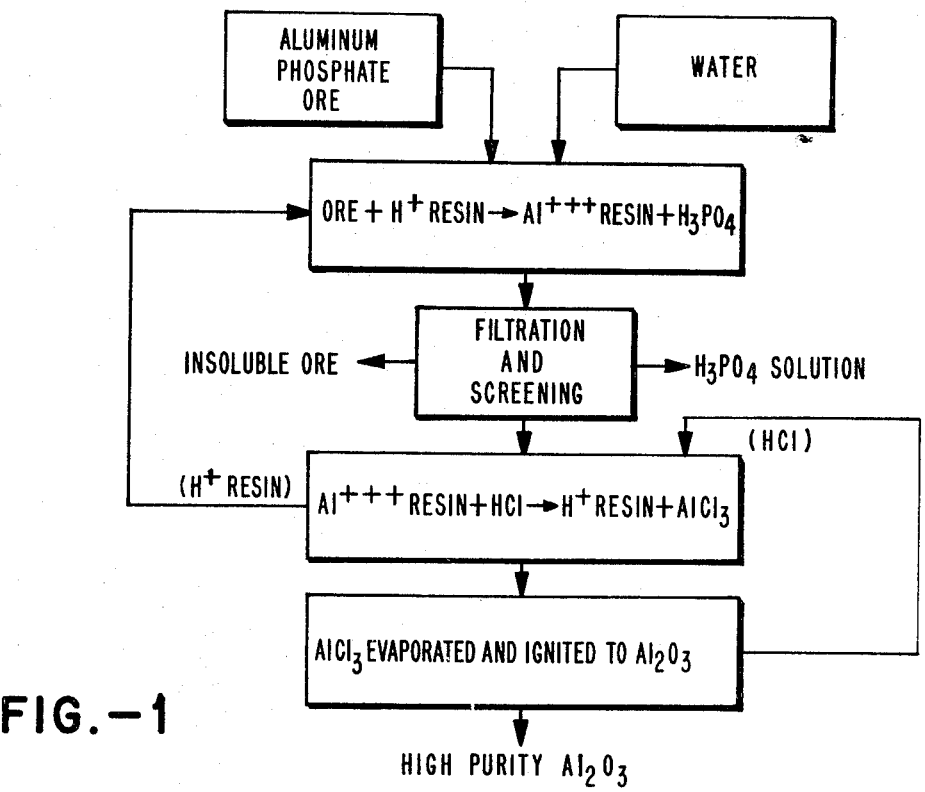
Figure 2:
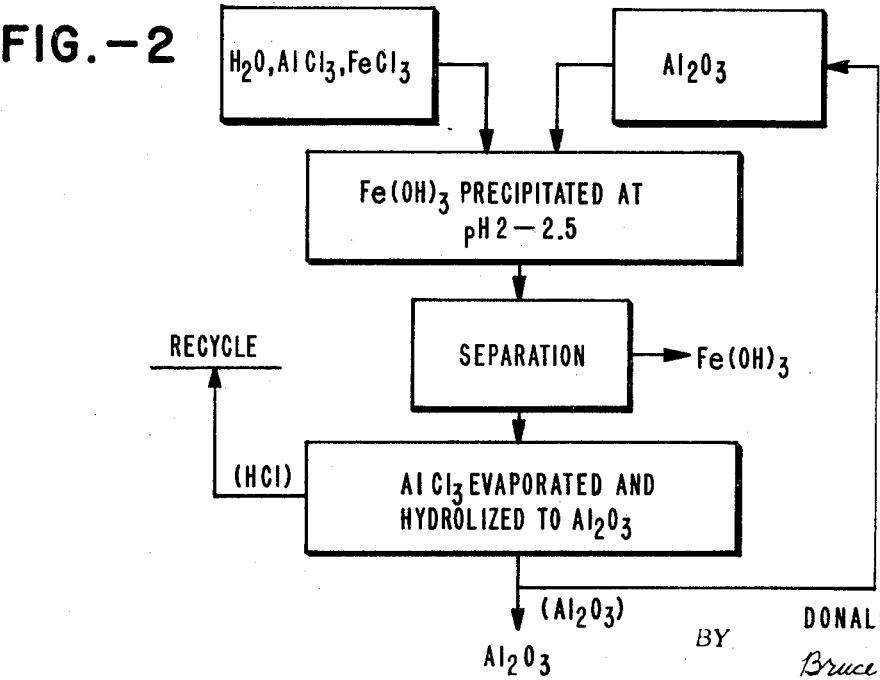

In the accompanying drawing there is illustrated:
FIG. 1, a diagrammatic flow sheet illustrative of the process operations of the invention wherein interfering ions are substantially absent; and
FIG. 2, a diagrammatic flow sheet illustrating the additional process operations of the invention wherein iron is separated from the aluminum.

In order that those skilled in the art may better understand how the present invention can be carried into effect, the following examples are given by way of illustration and not by way of limitation. All parts and percentages are by weight unless otherwise stated.

EXAMPLE I

A 2.5 gram quantity of an aluminum phosphate ore, which was mined in Mexico and designated "Fosforica," is admixed with 10 milliliters of Dowex 50W-X8 resin (strongly acid sulfonated styrene-divinylbenzene) in the hydrogen form and 15.7 milliliters of water. The admixture is allowed to equilibrate for a period of 50 minutes at 80 degrees centigrade, and the solution is then separated from the solid components of the admixture by filtration. The resulting solution is found to contain 1.82 millimoles (0.18 gram) of phosphoric acid and only 0.00139 millimole aluminum. The resin in the aluminum form is eluted with 7 milliliters of 10 weight percent hydrochloric acid, which removes, as the chlorides, the aluminum and some iron which is present in the ore as an impurity. The eluate is evaporated to convert the aluminum and iron chlorides to the respective oxides, which are then ignited at red heat. The iron is leached from the refractory alumina with 10 percent hydrochloric acid. A 0.07 gram quantity of fine white aluminum oxide powder suitable for use in ceramic manufacture is obtained. The HCl evolved during the evaporation and conversion of the chloride solution is condensed and recycled to the resin regeneration step. The aluminum present in the ore is 43 weight percent in excess of the total capacity of the resin. Thirty-two weight percent of the total resin capacity is utilized, and 22.5 weight percent of the aluminum in the ore is recovered in the aluminum oxide product.

EXAMPLE II

A 20 gram sample of the aluminum phosphate ore, described in Example I, above, which has been ground to pass a 200 mesh screen is admixed with 100 milliliters of Dowex 50W-X8 resin in the hydrogen form and 100 milliliters of water. The admixture is allowed to equilibrate for one hour at 80 degrees centigrade, after which the solution is separated from the solid components by filtration. The solution is found to contain 17.4 millimoles (1.71 grams) of phosphoric acid. The aluminum form of the resin is separated from undissolved ore by screening and is eluted with 70 milliliters of 10 percent hydrochloric acid which removes the aluminum and iron as soluble chlorides. Reactive aluminum oxide is added to the eluate to adjust the pH to a value of 2.1. The resultant precipitate of ferric hydroxide is removed by filtration. The iron free filtrate is spray dried and hydrolized to aluminum oxide. The aluminum present in the ore is 14.2 weight percent in excess of the total capacity of the resin. Thirty and seven-tenths weight percent of the total resin capacity is utilized, and 26.9 weight percent of the aluminum in the ore is recovered in the aluminum oxide product from the practice of this single stage batch example. Using countercurrent techniques will result in the recovery of about 90 weight percent or more of the aluminum in the ore. The HCl is recovered by condensation of an azeotropic mixture having about 20 weight percent HCl in water. This azeotropic mixture is suitable for reuse in regenerating resin.

The strongly cation exchange resin is used in its hydrogen form in the practice of this invention. The sodium form of the resin is relatively ineffective in solubilizing the aluminum phosphate ores. The admixture, according to Example I, above, of equal portions of finely ground Fosforica aluminum phosphate ore with 15 milliliters of water and respectively 10 milliliters of Dowex 50W–X8 in the hydrogen form and 10 milliliters of Dowex 50W–X8 in the sodium form shows that the percentage resin utilization, in a single stage at 80 degrees centigrade, of the hydrogen form is 32 percent, whereas it is only 11 percent for the sodium form.

The cation exchange resin employed in the practice of this invention is a water insoluble strongly acidic cation exchange resin, such as Dowex 50 which is a water insoluble resin containing a plurality of sulfonic acid groups which groups are attached to a cross-linked polymerizate of a polyvinyl aryl monomer. Such strongly acidic cation exchange resins are commercially available under such designations as "Rexyn 101," "Amberlite IR–21," "Amberlite 200," "Duolite C20," "Duolite ES26," and "Duolite C25D."

Preferably, in the preparation of the ore for treatment according to this invention, it is subdivided into relatively fine particles so as to facilitate the extraction of economic values from it. Since it is necessary to separate the resin from the undissolved ore by screening, classification, sizing, sorting, or other suitable solid-solid separation techniques, preferably the resin and ore have substantially different particle sizes. The ore is preferably reduced to a size which is sufficiently smaller than the resin to make separation easy.

The resin is contacted with the ore in an aqueous environment at a temperature which is adjusted to achieve the highest selectivity coefficient for aluminum and the highest reaction rate. In general, the cation exchange resins exhibit the highest selectivity coefficient for aluminum over hydrogen at temperatures between about 25 and 150 degrees centigrade and preferably between about 60 and 100 degrees centigrade. For elevated temperatures in excess of the boiling point of the admixtures, it is necessary to employ pressurized reaction vessels. Pressurized reactors are generally more difficult and expensive to use than unpressurized reactors so temperatures in excess of about 100 degrees centigrade are generally not employed. At temperatures below about 50 degrees centigrade the reaction rates are generally so slow that the retention times of the ore and resin in the reaction vessel are so long that it is uneconomical to operate the process. In general, at temperatures of about 25 degrees centigrade the reaction times to reach equilibrium are about eight hours or more, and at 150 degrees centigrade they are about 15 minutes or less. At from about 60 degrees centigrade to 100 degrees centigrade the times range from about two hours to one-half hour. The optimum times and temperatures are dependent upon the individual characteristics of the ore and the resin and may be determined by practicing the teachings of this disclosure.

While the process of this invention may be practiced in batch operations, preferably it is carried out in continuous countercurrent equipment with fresh resin contacting nearly exhausted ore at one end of the operation and fresh ore contacting nearly fully loaded resin at the other end of the operation. Countercurrent operations are efficient in utilizing the full capacity of the resin and in extracting almost quantitative amounts of aluminum from the ore.

The volume of water employed in the resin-ore contacting step is preferably kept at as low as possible so as to avoid diluting the phosphoric acid solution. In general the volume of the water may range from one-quarter to ten times the volume of the resin, but preferably the volume of the water is from one to two times the volume of the resin.

The quantity of resin employed is adjusted to the quantity of ore so that there is never more than one equivalent weight of ore for one equivalent weight of resin, and preferably the proportions of ore and resin are chosen so that they are present in an equivalent ratio of no more than about 0.9 to 1, ore to resin, respectively.

The regeneration of the cation exchange resin may be conveniently accomplished in a column through which an aqueous 20 weight percent solution of HCl is passed. The quantity of acid employed is generally in excess of the stoichiometric amount required to accomplish regeneration. The excess HCl is recovered from the resultant aluminum chloride solution by distillation to give the azeotropic mixture of about 20 weight percent HCl in water. The aluminum chloride solution is dried, and the aluminum chloride is hydrolized to alumina. Conveniently, this is accomplished in a spray tower in which the aluminum chloride is sprayed against a stream of combustion gas to evaporate the water and hydrolize the aluminum chloride to aluminum oxide. The HCl which evolves during drying and hydrolysis is condensed and recovered for recycle.

The aluminum phosphate ores often contain iron which is carried with the aluminum by the cation exchange resin. The iron is conveniently separated from the chloride solution which has been stripped from the cation exchange resin. This iron separation is accomplished by recycling a portion of the aluminum oxide from the spray drying and hydrolysis step. The aluminum oxide is added to the chloride solution in a quantity sufficient to adjust the pH of the chloride solution to a value of between about 2 and 2.5. At this pH the iron precipitates as ferric hydroxide and is separated from the chloride solution by filtration or the like. If desired, the iron may also be carried through the spray drying and hydrolysis step and ignited with aluminum to the respective oxides. The resultant alumina is a refractory material which is very insoluble in hydrochloric acid. The ferric oxide also tends to be refractory and insoluble; however, it is more soluble in acid than the alumina. The ferric oxide is solubilized by acid and is separated from the alumina by filtration. In general, it is preferred to separate the iron from the chloride solution rather than to leach the iron oxide from the alumina.

As will be understood by those skilled in the art, what has been described are preferred embodiments in which modifications and changes may be made without departing from the spirit and scope of the accompanying claims.

What is claimed is:

1. A process comprising:
bringing an aqueous suspension of solid phase aluminum phosphate containing ore which includes iron values, and a solid phase cation exchange resin in the hydrogen form into intimate contact at a temperature of at least about 50 degrees centigrade to effect ion exchange therebetween, yielding aqueous phosphoric acid and the aluminum form of said cation exchange resin;

physically separating said aqueous phosphoric acid from the aluminum form of said cation exchange resin;

eluting an aqueous suspension of said aluminum form of said cation exchange resin with hydrochloric acid, yielding the hydrogen form of said cation exchange resin and an aqueous admixture of aluminum chloride and iron chloride;

separating said hydrogen form of said cation exchange resin from said aqueous admixture;

recycling the separated hydrogen form of said cation exchange resin for contact with said aluminum phosphate containing ore;

evaporating and hydrolyzing said aqueous admixture to yield an admixture containing aluminum and iron oxides;

calcining said oxide admixture to yield a dry oxide admixture of refractory aluminum and iron oxides;

recovering the hydrochloric acid evolved during said evaporating, hydrolyzing, and calcining;

treating said dry oxide admixture with hydrochloric acid to yield an admixture of aqueous iron chloride and solid aluminum oxide; and separating said solid aluminum oxide from said aqueous iron chloride.

2. A process of claim 1 including recycling the recovered hydrochloric acid for contact with the aluminum form of the cation exchange resin.

3. A process according to claim 1 including, evaporating the aqueous iron chloride solution, calcining the resultant solid product to refractory iron oxide, and recovering hydrochloric acid evolved during the evaporation and calcining of said aqueous iron chloride solution.

References Cited

UNITED STATES PATENTS

| 2,567,661 | 9/1951 | Ayres | 75—101 BE |
| 2,723,904 | 11/1955 | Reeve | 23—200 |
| 1,778,083 | 10/1930 | Marburg | 23—143 |
| 2,462,499 | 2/1949 | Hoak | 23—200 |

FOREIGN PATENTS

| 153,500 | 11/1920 | Great Britain | 23—143 |
| 1,533,513 | 7/1968 | France | 23—165 C |

OSCAR R. VERTIZ, Primary Examiner

H. S. MILLER, Assistant Examiner

U.S. Cl. X.R.

75—101 BE; 423—139, 317, 481